INVENTORS
TOSHIO HIRAI
TAKEHIRO MOORI
HIROSHI MASAGO

BY *Wenderoth, Lind & Ponack*

ATTORNEYS

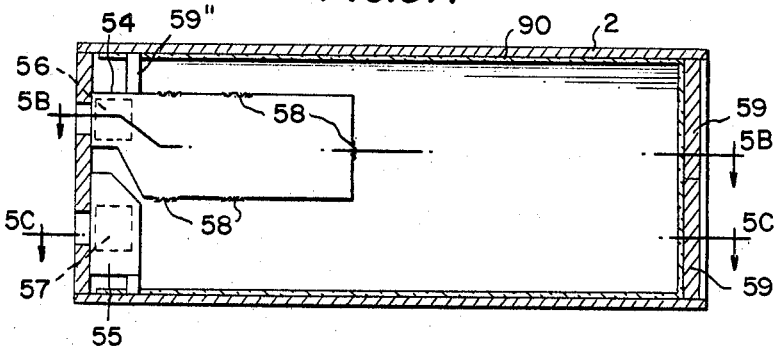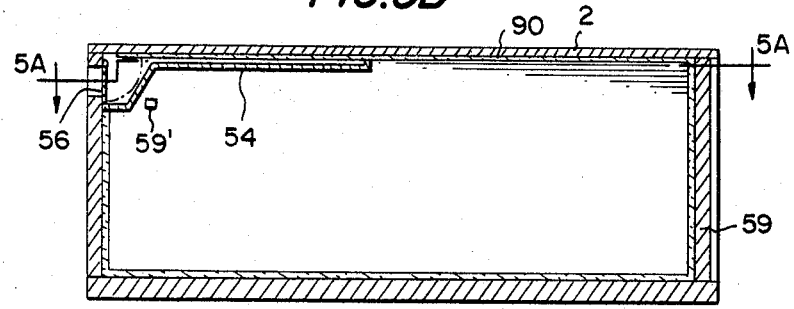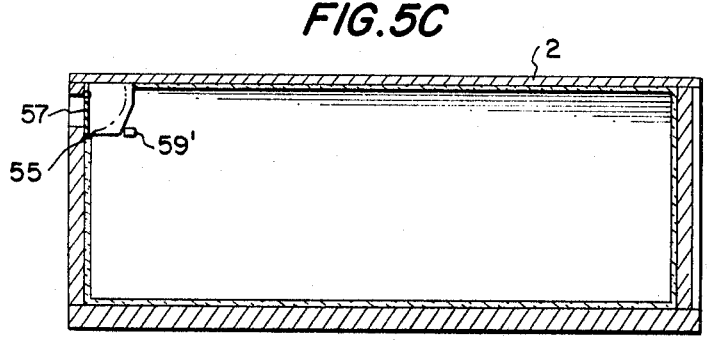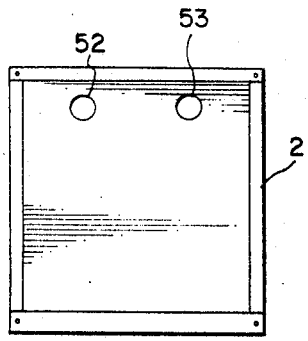

INVENTORS
TOSHIO HIRAI
TAKEHIRO MOORI
HIROSHI MASAGO

BY, Wenderoth, Lind & Ponack,
ATTORNEYS

United States Patent Office 3,440,834
Patented Apr. 29, 1969

3,440,834
APPARATUS FOR TRANSPORTING REFRIGERATING CONTAINERS AND COOLED CONTAINERS USED THEREFOR
Toshio Hirai, Narashino, and Takehiro Moori and Hiroshi Masago, Yokohama, Japan, assignors to Osaka Shosen Mitsui Senpaku Kabushiki Kaisha (Mitsui O.S.K. Lines Ltd.), Tokyo, Japan
Filed June 30, 1967, Ser. No. 650,311
Claims priority, application Japan, Jan. 11, 1967, 42/1,725
Int. Cl. B63j 2/12; B60p 3/20; F25d 17/08
U.S. Cl. 62—409                                   9 Claims

ABSTRACT OF THE DISCLOSURE

Apparatus for storing and transporting cargos requiring refrigeration, comprising a refrigerating system capable of supplying cold gas, at least one cold gas supply duct connected to said refrigerating system and having at least one valved gas outlet therealong, at least one cold gas return duct connected to said refrigerating system and having at least one valved gas inlet therealong, a flexible hose on said gas outlet and a flexible hose on said gas inlet, and at least one cargo storage container having an inlet opening and an outlet opening therein to which the respective flexible hoses are detachably connected, whereby cold gas can be circulated through said container, and said container can be detached from the supply and return ducts and moved to another location and attached to a similar supply and return duct system.

---

The present invention relates to a method and apparatus for transportation by land and by sea of cooled container, in which there is provided a refrigerating system on a ship, a storage depot on land and a chassis for overland transportation of said containers, rather than in the containers themselves. The temperature of the frozen cargos contained in the containers is controlled by cooling the containers with cold air or cold gas (hereinafter referred to as simply cold gas) supplied from the above refrigerating systems when and where necessary.

The invention also relates to the cooled containers used in the above described method.

It is to be understood that the term "refrigerating system" used herein refers broadly to an apparatus comprising a refrigerating apparatus, consisting of a compressor and a condenser, and a cold gas supplying device consisting of a fan and a heat exchanger.

It is also to be understood that the term "chassis" used herein refers broadly to include a flat chassis with or without wheels and a flat car of railroad.

Heretofore it has been proposed to transport frozen cargos by land and by sea by loading them in refrigerating containers each of which is equipped with refrigerating system. However if the refrigerating system were removed from each refrigerating container, the capacity of the container would be greatly increased, the weight thereof would be greatly reduced and the work involved in maintaining and repairing the separate refrigerating system in each container would be eliminated, thereby greatly improving the efficiency of the containers. This would be very advantageous from the economic point of view.

In order to refrigerate the cargos contained in a container without self-contained refrigerating system, two methods can be used, one directly supplying cold gas from outside the container into the container and the other by circulating refrigerating medium from the central refrigerating system through coils arranged in the container. Of these two methods the former method is more advantageous than the latter in that the temperature control is more easily carried out when transporting a large number of frozen cargos of the same kind, there is no fear of leakage of refrigerating medium into the container due to damage of the coils, and the flow quantity of cold gas can be adjusted more easily. In this method, cold gas can be fed by the fan of an air cooling device or a gas cooling device (hereinafter referred to simply as a cooler) through a supply duct and a coupling fixture coupled to the container and after having cooled the frozen cargo, will be induced back to said cooler through another coupling fixture coupled to the container and then through a return duct. The cooler is cooled by the refrigerating medium from the refrigerating apparatus. The cold gas thus circulates in a closed circuit.

According to the present invention the refrigerating system comprising the refrigerating apparatus and the cold air supplying device which comprises the cooler, the fan, the ducts and the coupling pipes are provided in each of ship, container storage depot and chassis, respectively. Since electric power sources are usually provided in ships and container storage depots, the refrigerating system provided may be powered from such electric power sources. In the case of a chassis, a gasoline engine or a diesel engine and a motor can be provided as a power source, by which the refrigerating apparatus and the fan of said system may be driven.

Transportation of frozen cargos by land and sea in a container without self-contained refrigeration system can be accomplished satisfactorily by connecting such a container being transported on a ship with the cold gas supplying device provided on said ship, by connecting such a container housed in a container storage depot awaiting further transportation with the cold gas supplying device provided at said container storage depot, and by connecting such a container being transported on a chassis with the cold gas supplying device on said chassis.

It will of course be understood that, depending on the cargo and on other conditions, refrigeration of frozen cargoes may not necessarily be continued during the entire time of transportation, and may be interrupted or even omitted, say in the contanier storage depot and/or on the chassis due to various circumstances such as the quantity and the character of said frozen cargos required refrigeration temperature, the time required for the transportation by land or sea, atmospheric temperature, duration of time at the container storage depot, etc. It is to be understood that all these cases are included within the scope of this invention.

Accordingly, it is an object of the present invention to provide an economic and effective method of transportation of frozen cargos by land and sea in which the temperature of the frozen cargos can easily be controlled.

It is another object of the present invention to provide a method of transportation of frozen cargoes in which the efficiency of transportation by land and by sea through a container storage depot can be improved.

It is still another object of the present invention to provide a cooled container which does not self-contain a refrigerating system and can be employed effectively in transportation and housing of frozen cargos as above mentioned.

Other and more specific objects and advantages of the present invention will become apparent from the following description wherein a preferred embodiment of the invention is described with reference to the accompanying drawings, in which:

FIG. 5 is a front elevation view of a container employed in the present invention;

FIG. 5A is a horizontal section view taken on line 5A—5A of FIG. 5B showing said container in FIG. 5;

FIG. 5B is a longitudinal vertical section taken on line B—B of FIG. 5A;

FIG. 5C is a longitudinal vertical section taken on line C—C of FIG. 5A;

Figure 6:
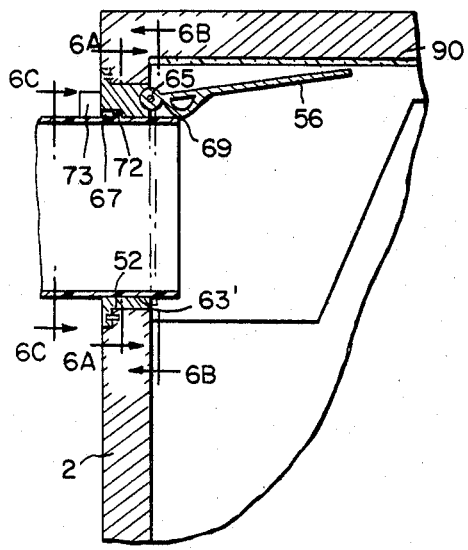
FIG. 6 is a partial sectional view, on an enlarged scale of the container of FIG. 5B.
Figure 6A:
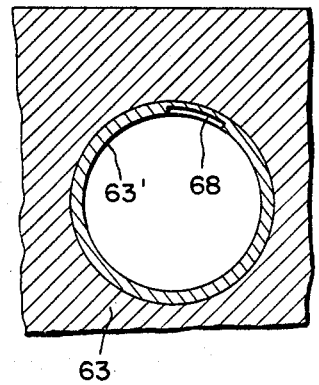
Figure 6B:
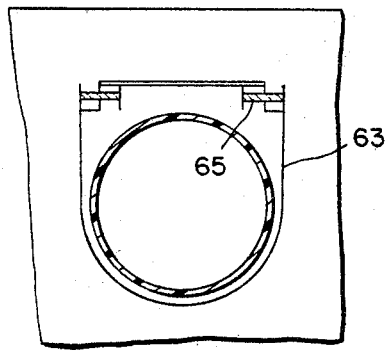
Figure 6C:
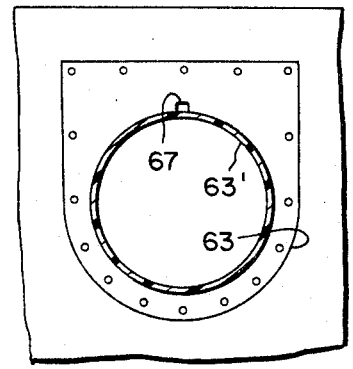
Figure 7A:
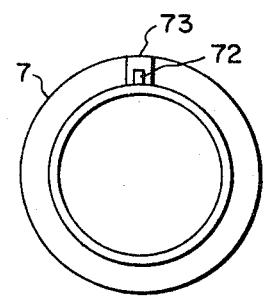
Figure 7:
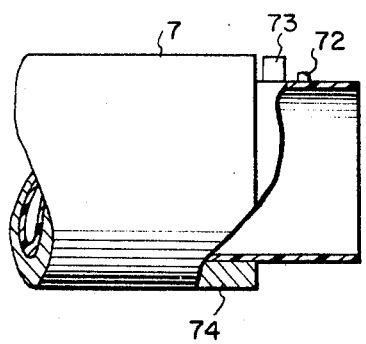

FIGS. 6A, 6B, and 6C are cross sections taken on lines 6A—6A, 6B—6B and 6C—6C of FIG. 6, with certain parts cut away, respectively;

FIG. 7 is a side elevation view of an end of a cold air coupling pipe shown in FIG. 6, a portion of which is shown in an axial section; and FIG. 7A is a front elevation view of the pipe of FIG. 7.

Figure 1:
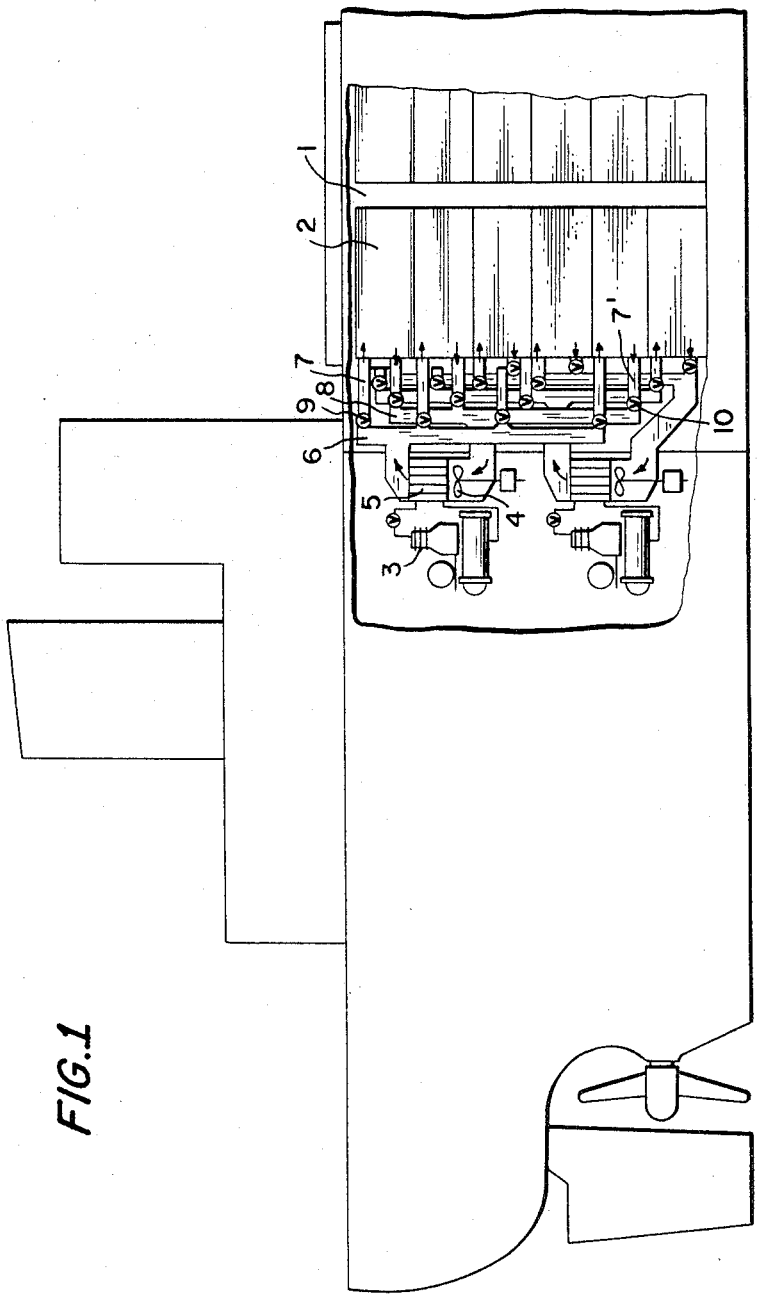
FIG. 1 is a partial side elevation view of a ship used for carrying out the method of transportation in accordance with this invention, a portion of which ship is broken away to show the relationship between the refrigerating system in said ship and the containers without self-contained such system.

Referring now to FIG. 1, containers 2 are loaded in cargo holds 1 aboard a ship. In the illustrated ship there is provided a plurality of refrigerating systems, each of which comprises a refrigerating apparatus 3, a fan 4, a cooler 5, a cold gas duct 6, electromagnetic valves 9, coupling pipes 7 and 7' coupled to the container 2 for supplying and withdrawing cold gas, a return duct 8 for returning cold gas from the containers, and automatic thermoregulating valves 10. Since the temperature condition suitable for one frozen cargo may be different from that suitable for other cargo, two or more cold gas supplying devices are provided, each including a fan, a cooling device, cold gas ducts, valves and coupling pipes coupled to the container for feeding and withdrawing cold gas. By adjusting the thermoregulating valve 10 provided in each of the return ducts so as to meet the desired temperature condition, the temperature in each of said containers 2 is kept at the desired temperature. The two systems for supplying cold gas can be arranged in parallel with each other independent of lines and rows of containers so that any container can be disposed at any position, or alternatively one system can be provided for each row of containers. It should be understood that any such arrangement of systems for supplying the cold gas is within the scope of the present invention.

Figure 2:
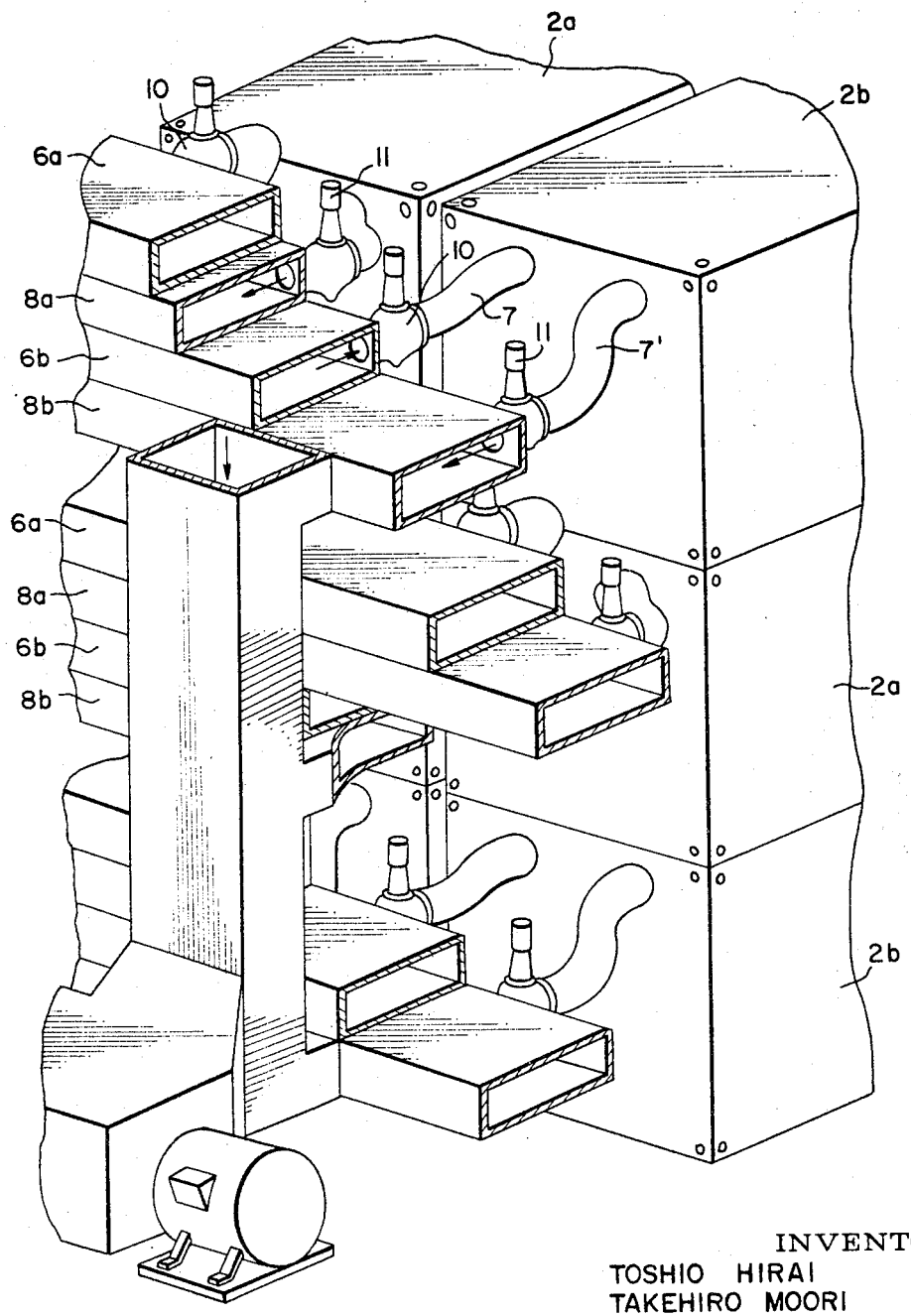
FIG. 2 is an enlarged perspective view, partly in section, of a part of FIG. 1.

Referring to FIG. 2, there is shown details of an arrangement of a cold gas supplying systems and the containers loaded in the container hold of the ship. In this case containers 2a each of which is filled with a frozen cargo for which one temperature condition is suitable and containers 2b each of which is filled with a frozen cargo for which other temperature conditions are suitable are stacked in any desired array. A cold gas manifold corresponding to said one temperature condition has a plurality of duct sets each of which comprises a supply duct 6a and a return duct 8a arranged in layers in number corresponding to the number of layers of loaded containers in the hold. Another cold gas manifold corresponding to the other temperature condition has a plurality of duct sets each of which comprising a feed duct 6b and a suction duct 8b also arranged in layers in number corresponding to the number of said container layers. The electro-magnetic valves 10, the thermoregulating valves 11, the coupling pipes 7 for feeding cold gas and coupling pipes 7' for suction of cold gas are provided on each set of ducts at each container position in a layer as proper components of the cold gas supply system. When the containers have been loaded into the hold in random positions in the layer containers 2a which should have the contents kept at said one temperature condition have the supply pipes 7 and the suction pipes 7' of the cold gas ducts 6a, 8a corresponding to said one temperature condition connected to the coupling fixtures fitted in coupling holes formed in each of the containers as will hereinafter be described. The coupling pipes 7 and 7' are flexible ventilating pipes wrapped with heat insulating material. Unless said pipes 7 and 7' are connected with one of said containers, the valves 10, and 11 are kept closed and prevent the cold gas from leaking out of the gas manifold. In connecting the supply pipes 7 and the return pipes 7' to the containers, improper connections might accidentally occur, wherein the pipes of one system are connected to containers which should be kept at the temperature of the other system. Therefore the coupling pipes for both supply and return are preferably provided with interlocking relays, whereby only after the coupling pipes of the same system have been properly connected to said containers can the valves 10 and 11 be energized through both said relays and opened thereby circulating the cold gas.

Figure 3:
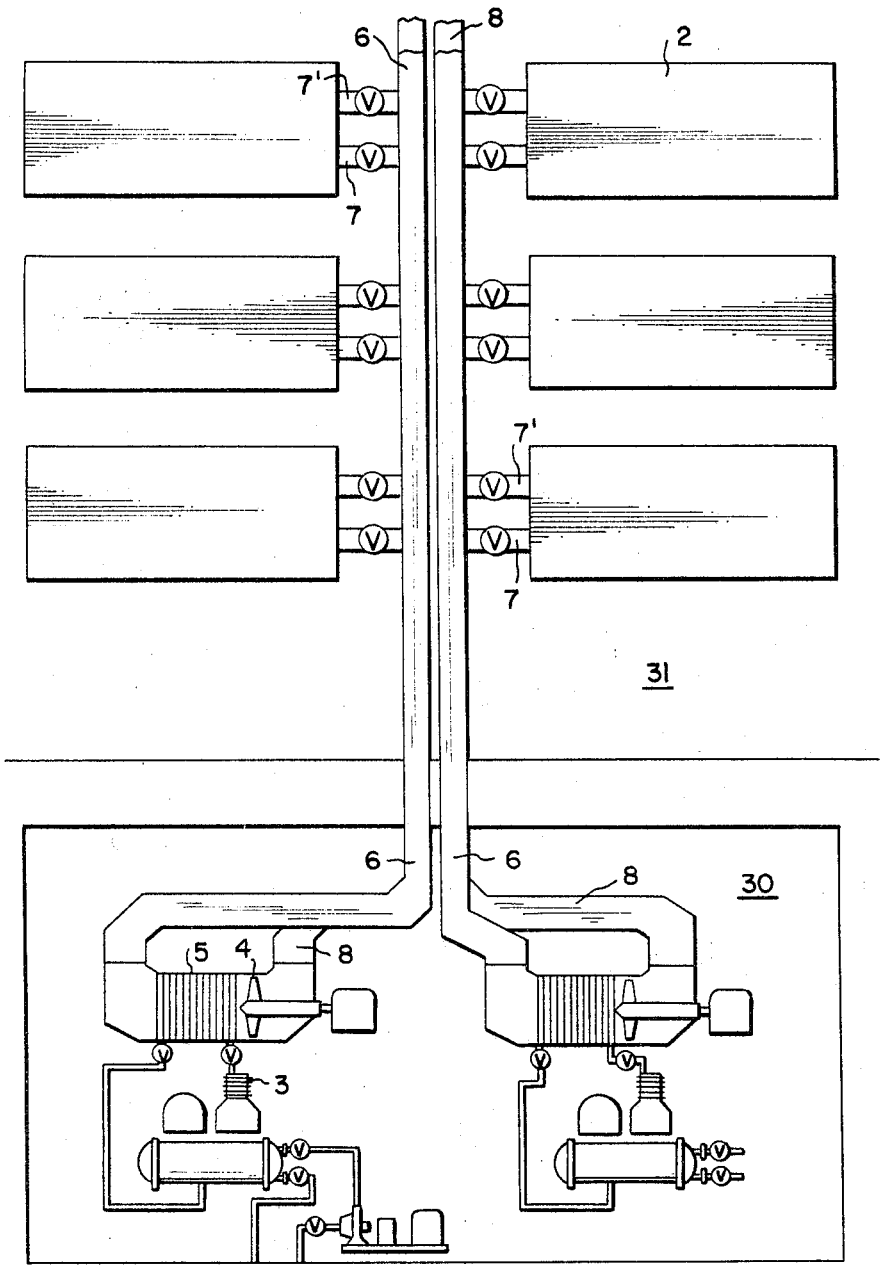
FIG. 3 is a schematic plan view showing the relationship between the cooled containers stored in a container storage depot employed for carrying out the method of the present invention and a refrigerating system provided in said depot.

As shown in FIG. 3, in a room for refrigerating systems 30 provided in a container storage depot there are arranged refrigerating apparatus 3, fans 4, coolers 5, cold gas ducts 6, suction ducts 8 and so on. Each of said ducts 6, 8 extends to a container storage area 31 in said container storage depot. In said area 31 each of the containers 2 is connected to one set of ducts 6, and 8 through the coupling pipes 7 and 7', respectively. There are two or more sets of the cold gas supplying systems each of which supplies cold gas at a different temperature condition. Thus the temperature in each container 2 can be controlled just as in a ship.

Figure 4:
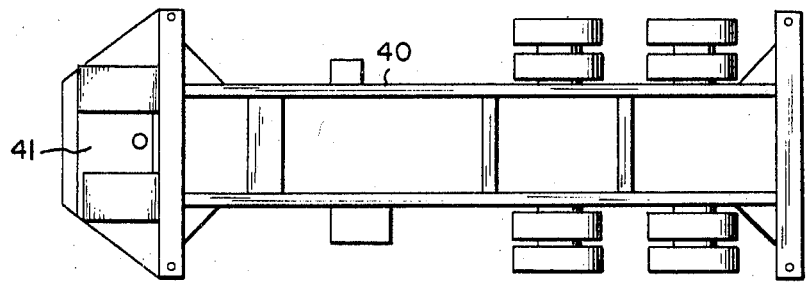
FIG. 4 is a plan view of a chassis employed for carrying out the method of the present invention, which chassis is provided with a refrigerating system.
Figure 4A:
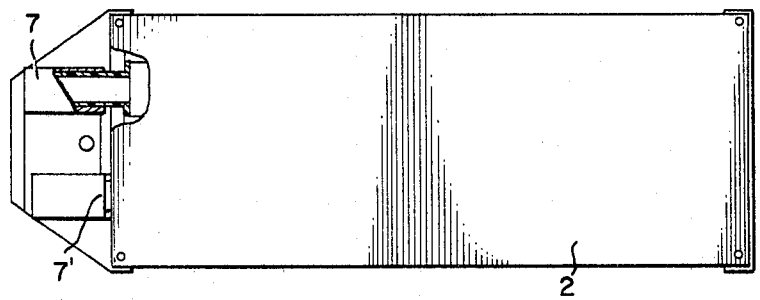
FIG. 4A is a plan view, partly broken away, of said chassis with a container loaded thereon.
Figure 4B:
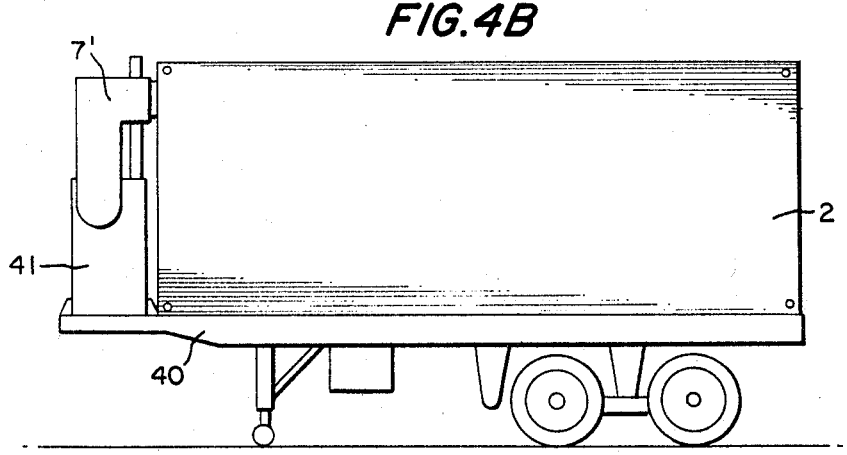
FIG. 4B is a side elevation view of the chassis of FIG. 4A.

Referring now to FIGS. 4, 4A and 4B there is shown a chassis 40 provided with a refrigerating system, the trailer being adapted to transport containers of the present invention by land, the chassis having a container 2 loaded thereon. On said chassis 40 is mounted a refrigerating system 41 comprising a refrigerating apparatus, a cold gas supplying device having a cooler, a fan and ducts, and a gasoline engine or a diesel engine and a motor for driving said refrigerating system. To the container 2 loaded on the chassis 40 are connected the coupling pipe 7 for supplying cold gas and the coupling pipe 7' for return of cold gas, whereby cold gas can be circulated through the container 2. Since only one container can be loaded on the chassis 40, the temperature control of the frozen cargo therein can be accomplished by a thermoregulator (not shown) provided in the refrigerating machine 41. Such regulator may be of any conventional type.

As shown in FIGS. 5, 5A, 5B and 5C, the containers are each provided with a coupling hole 52, for feeding cold gas and a coupling hole 53 for return of cold gas, the coupling holes being in the end wall of the container 2 opposite to a door 59 forming the other end thereof. Heat insulation material 90 is applied to the interior walls of the container 2. On the inside surface of one wall of the container 2 is provided a distributing manifold 54 into which cold gas is fed, the manifold having a damper 56 pivoted thereon to pivot open and shut over the opening 63' of a coupling fixture through which cold gas is fed into the container, as will be described hereinafter. A collecting manifold 55 for return of cold gas is mounted on the wall of the container 2 inside opening 53, and has a damper 57 thereon which is adapted to open and shut over the opening 53 of a coupling fixture through which cold gas is withdrawn from the container. The distributing manifold 54 has a plurality of injecting apertures 58 each provided with a wire netting having a fine mesh. The dampers 56 and 57 are adapted to be closed so as to prevent the atmospheric air from flowing in and out of the container 2 when the coupling pipes 7 and 7' are not connected to said container 2. The dampers are adapted to be opened only after said pipes 7 and 7' have been connected to said container 2. The cold gas is injected from the distributing manifold 54 disposed along the ceiling of the container 2 through the apertures 58 into the interior of the container 2 and flows downwardly along the side walls thereof and then toward the collecting manifold 55 over the floor surface and is drawn out by the fan in the cold gas supplying device. A protecting beam 59' is provided so as to prevent the cargo in the container 2 from being stacked against the cold gas distributing manifold 54 and preventing the manifold from being damaged by the cargo when the cargo is subjected to any impulsive force.

As shown in FIGS. 6, 6A, 6B and 6C, there is provided in the coupling hole 52 for feeding cold gas into the container 2 a coupling fixture 63 which has an opening 63' for receiving the coupling pipe 7. On a pin 65 on said fixture 63 is pivotally mounted the damper 56. On the inner surface of the opening 63' of the fixture 63 an axial channel 67 for guding a locking pin 72 which is mounted on the coupling pipe 7 as will be described hereinafter. Said axial channel 67 communicates with a circumferential channel 68 which is formed in the surface of the coupling fixture 63 which defines the opening 63'. For connecting the coupling pipe 7 to the container 2, the leading end of the coupling pipe 7 is pushed into the opening 63' of the coupling fixture 63 keeping the locking pin 72 in alignment with said channel 67 until said pin 72 reaches said channel 68. Then the coupling pipe 7 is rotated with the pin 72 moving along the channel 68. This connecting system is in principle an application of the twist locking system. When the coupling pipe 7 is inserted into the opening 63' of the coupling fixtures 63, the leading end of said pipe 7 will engage with a projection 69 provided on the damper 56 and then push the projection 69 thereby opening the damper 56 to its open position. The positions of the channel 68 provided in the coupling fixture 63 and the pin 72 mounted on the coupling pipe 7 may of course be established so as to perform said operation without any difficulty. The coupling pipe 7' for return of cold gas is connected in the same manner. As shown in FIGS. 7 and 7A the coupling pipe 7 is made of a flexible tube wrapped with a tube of heat insulating material 74 and has an interlocking relay 73 mounted thereon for controlling the thermoregulating valve 10 as described hereinabove.

From the foregoing description, it will be readily understood that, with the present invention, transportation of frozen cargos by sea or by land or storage of the cargos in container storage depots can be accomplished separately, when and where necessary, by use of the equipment for supplying cold gas provided at any desired spot. Of course when all of the related ships, container storage depots and trailers are provided with cold gas supplying devices, continuous transportation by land and sea can be accomplished.

While there has been shown and described a preferred embodiment of this invention, it will be appreciated that other embodiments will become apparent to those skilled in the art upon the reading of this disclosure, and, therefore, the invention is not to be limited by this disclosure except as set forth in the appended claims.

What is claimed is:

1. Apparatus for storing and transporting cargos requiring refrigeration, comprising a refrigeration system capable of supplying cold gas, at least one cold gas supply duct connected to said refrigerating system and having at least one valved gas outlet therealong, at least one cold gas return duct connected to said refrigerating system and having at least one valved gas inlet therealong, a flexible hose on said gas outlet and a flexible hose on said gas inlet, and at least one cargo storage container comprising walls defining an enclosed space for the cargo, one of said walls having an inlet opening and an outlet opening to which the respective flexible hoses are detachably connected, a coupling fixture having a passage therethrough disposed in each opening, each of said flexible hoses and each of said coupling fixtures having complementally formed quick-attaching-and-detaching coupling means to facilitate said connection of said hoses thereto, each of said coupling fixtures further including a damper hingedly attached to the inside thereof and including means to normally resiliently bias it in the position covering the passage in the fixture when said hoses are not connected thereto, whereby cold gas can be circulated through said container and said container can be detached from the supply and return ducts and moved to another location and attached to a similar supply and return duct system.

2. Apparatus as claimed in claim 1 in which there are a plurality of gas outlets and a plurality of gas inlets, and a plurality of containers, each attached to a set of gas outlets and gas inlets.

3. Apparatus as claimed in claim 1 in which there are a plurality of supply ducts and a plurality of gas return ducts, each having a plurality of gas outlets and gas inlets respectively, and means included in said refrigeration system for supplying cold gas of a different temperature to each pair of ducts consisting of a gas supply duct and a gas return duct, and a plurality of containers, each attached to a set of gas outlets and gas inlets.

4. Apparatus as claimed in claim 3 in which said pairs of ducts are positioned one above the other with the ducts in each pair one above the other, and said containers are stacked in layers, there being a complete set of pairs of ducts for each layer of containers, whereby containers which have to be stored at different temperatures can be stacked at random in the layers and there will be gas of the proper temperature available from one pair of ducts.

5. In a ship having a hold for storage of cargo during transport, that improvement comprising a refrigerating system capable of supplying cold gas, at least one cold gas supply duct in said hold and connected to said refrigerating system and having at least one valved gas outlet therealong, at least one cold gas return duct connected to said refrigerating system and having at least one valved gas inlet therealong, a flexible hose on said gas outlet and a flexible hose on said gas inlet, and at least one cargo storage container in said hold, said container being of the type defined in combination with claim 1, whereby cold gas can be circulated through said container in said hold and said container can be attached to said supply and return ducts when it is placed in the hold and detached therefrom when it is removed from the hold.

6. In a container storage depot having a space for storage of cargo during awaiting transport, that improvement comprising a refrigerating system capable of supplying cold gas, at least one cold gas supply duct in said storage space and connected to said refrigerating system and having at least one valved gas outlet therealong, at least one cold gas return duct connected to said refrigerating system and having at least one valved gas inlet therealong, a flexible hose on said gas outlet and a flexible hose on said gas inlet, and at least one cargo storage container in said storage space, said container being of the type defined in combination with claim 1, whereby cold gas can be circulated through said container in said storage space and said container can be attached to said supply and return ducts when it is placed in the storage space and detached therefrom when it is removed from the storage space.

7. In a truck trailer having a chassis for storage of cargo during transport, that improvement comprising a refrigerating system capable of supplying cold gas, at least one cold gas supply duct on said chassis and connected to said refrigerating system and having at least one valved gas outlet therealong, at least one cold gas return duct connected to said refrigerating system and having at least one valved gas inlet therealong, a flexible hose on said gas outlet and a flexible hose on said gas inlet, and at least one cargo storage container on said chassis, said container being of the type defined in combination with claim 1, whereby cold gas can be circulated through said container on said chassis and said container can be attached to said supply and return ducts when it is placed on the chassis and detached therefrom when it is removed from the chassis.

8. A container for use in storing and transporting cargos requiring refrigeration, comprising walls defining an enclosed space for the cargo, one of said walls having an inlet opening and an outlet opening therein, a hose coupling fixture having a passage therethrough disposed in each opening, and each coupling fixture having a groove in the surface defining the passage and extending parallel to the axis thereof for part of the axial length of said coupling fixture, and each coupling fixture further having a circumferential groove in the surface defining the passage and extending for only a part of the circumference of said surface whereby the end of an associated hose carrying refrigerated gas and having a radial projection thereon can be inserted into said passage and the projection will be guided along the groove and then around the circumferential groove for holding the end of the flexible hose in the coupling fixture.

9. A container as claimed in claim 8 in which said coupling fixture further has a damper hinged to the inside thereof within the container adapted to cover the passage in the fixture, said damper having a projection thereon adjacent the edge of the passage next to the hinged connection between the damper and the fixture, whereby the end of a hose inserted into said fixture will engage the projection and swing the damper open when the hose is inserted into the fixture.

References Cited

UNITED STATES PATENTS

| | | | |
|---|---|---|---|
| 141,040 | 7/1873 | Dunbar | 285—189 |
| 2,197,437 | 4/1940 | Reilly | 62—62 |
| 2,303,867 | 12/1942 | Stebbins | 62—64 |
| 2,778,206 | 1/1957 | Wilson et al. | 62—239 X |
| 3,326,580 | 6/1967 | Munier et al. | 285—203 X |
| 3,225,822 | 12/1965 | Westling | 62—240 |

MEYER PERLIN, *Primary Examiner.*

W. E. WAYNER, *Assistant Examiner.*

U.S. Cl. X.R.

62—240, 299; 285—189